(12) United States Patent
Hauptmann et al.

(10) Patent No.: US 10,736,310 B2
(45) Date of Patent: Aug. 11, 2020

(54) METHOD FOR CAPTURING MOSQUITOES BY PRODUCING A CARBON DIOXIDE FROM THE AMBIENT AIR

(71) Applicant: DIPTERATECH, Vence (FR)

(72) Inventors: Dominique Hauptmann, Saint Paul de Vence (FR); Gerard Benbassat, Vence (FR)

(73) Assignee: DIPTERATECH (FR)

( * ) Notice: Subject to any disclaimer, the term of this patent is extended or adjusted under 35 U.S.C. 154(b) by 0 days.

(21) Appl. No.: 14/899,079

(22) PCT Filed: Jun. 16, 2014

(86) PCT No.: PCT/FR2014/000133
§ 371 (c)(1),
(2) Date: Dec. 16, 2015

(87) PCT Pub. No.: WO2014/202843
PCT Pub. Date: Dec. 24, 2014

(65) Prior Publication Data
US 2016/0128314 A1    May 12, 2016

(30) Foreign Application Priority Data
Jun. 17, 2013 (FR) .................................... 13 01405

(51) Int. Cl.
*A01M 13/00* (2006.01)
*A01M 1/02* (2006.01)
*A01N 59/04* (2006.01)
*A01M 1/10* (2006.01)

(52) U.S. Cl.
CPC ............ *A01M 13/00* (2013.01); *A01M 1/023* (2013.01); *A01M 1/106* (2013.01); *A01N 59/04* (2013.01)

(58) Field of Classification Search
CPC .......... A01M 1/02; A01M 1/023; A01M 1/06; A01M 1/10; A01M 1/106; A01M 13/00; A01M 1/00; A01N 59/04
USPC ................................ 43/107, 125, 132.1, 139
See application file for complete search history.

(56) References Cited

U.S. PATENT DOCUMENTS 5,669,176 A * 9/1997 Miller .................... A01M 1/023
                                                              43/107
5,689,974 A * 11/1997 Fujita ................. B01D 53/0462
                                                              62/644
6,145,243 A * 11/2000 Wigton .................... A01M 1/02
                                                              43/107

(Continued)

FOREIGN PATENT DOCUMENTS

WO       2006108244 A1    10/2006

*Primary Examiner* — Darren W Ark
*Assistant Examiner* — Brady W Frazier
(74) *Attorney, Agent, or Firm* — Tarolli, Sundheim, Covell & Tummino LLP

(57) ABSTRACT

The invention concerns a process for capturing mosquitoes by producing carbon dioxide ($CO_2$) directed towards one or more mosquito traps, the $CO_2$ being separated from the ambient air in at least one central system via at least one bed of microporous solid type materials, said process enabling an incoming flow of ambient air comprising 0.039% $CO_2$ to be used to produce, in the direction of one or more mosquito traps, an outgoing gaseous flow of $CO_2$ with a controlled regular flow rate comprising at least 10 g/hour/trap.

7 Claims, 7 Drawing Sheets

(56) References Cited

U.S. PATENT DOCUMENTS

| | | |
|---|---|---|
| 7,347,994 B2 | 3/2008 | Tenney et al. |
| 8,959,831 B2* | 2/2015 | Smith .................. A01M 1/023 43/107 |
| 2001/0045051 A1* | 11/2001 | Miller .................... A01M 1/02 43/107 |
| 2003/0172808 A1* | 9/2003 | Le Bec .................... C01B 3/56 95/96 |
| 2008/0138372 A1* | 6/2008 | Tenney ................. A01N 25/18 424/409 |
| 2009/0232861 A1* | 9/2009 | Wright .................. A01N 59/04 424/405 |
| 2012/0076711 A1* | 3/2012 | Gebald ............. B01D 53/0462 423/228 |
| 2013/0142753 A1 | 6/2013 | Prohaska |
| 2014/0322360 A1* | 10/2014 | Rose .................... A01M 1/023 424/700 |

* cited by examiner

METHOD FOR CAPTURING MOSQUITOES BY PRODUCING A CARBON DIOXIDE FROM THE AMBIENT AIR

The invention concerns a process for capturing mosquitoes by producing carbon dioxide ($CO_2$) from the ambient or atmospheric air.

Man has long sought to combat biting insects and especially mosquitoes, which cause itching and transmit diseases. Today there are passive or active methods, either biological or chemical, adapted to the development stage of these insects.

It is known that the $CO_2$, which mammals and humans in particular exhale helps certain insects to find their bearings and locate their food source. Thus the $CO_2$ which we breathe out allows insects, especially mosquitoes, to find us even in total darkness. Researchers have even identified receptors sensitive to $CO_2$ in mosquitoes.

Man has thus developed techniques to trap mosquitoes using diffusion of $CO_2$. The principle of adult (female) mosquito traps is as follows:

The trap emits $CO_2$ in "sufficient" quantity so that female mosquitoes, in search of blood to nourish their eggs, approach the trap, A second bait, emitting odours similar to those of skin, draws the mosquitoes even closer to the trap, The trap has a suction process which enables the mosquitoes to be captured.

The "sufficient" quantity of $CO_2$ must be of the same order of magnitude as that produced by the breathing of a human being, i.e. approximately 20 to 60 g/hour. Up to now, attempts to generate the $CO_2$ chemically (for example from yeast) have not enabled this level of production to be reached. The only two systems which are used in practice are either the burning of butane or propane gas with slow-combustion burners or the use of compressed $CO_2$ cylinders. These techniques are described in particular in documents WO9937145, WO200332722, US20060156618 and WO2007135687.

In the case of single traps using conventional 13 kg butane or propane cylinders, which will last for approximately one month of use, this is acceptable in terms of both cost and the inconvenience involved in changing the cylinder. However, these single traps, which are supposed to protect areas of 1000 to 5000 m$^2$, although they do indeed capture mosquitoes, are unable to rid such areas of all mosquitoes and above all do not prevent mosquitoes in the surrounding area from continuing to be a nuisance.

To remedy this shortcoming, the "Biobelt®" concept was developed. This consists in surrounding an area to be protected with a set of traps positioned every 8 to 10 metres, the number varying according to the perimeter of the area to be protected. This principle has proven very effective, but the drawback is increased consumption of $CO_2$.

The use of conventional traps each with their own butane cylinder cannot be envisaged either from a practical point of view or from the point of view of the cost of the consumable product. Today the only viable solution is the use of a $CO_2$ cylinder which supplies all the traps. The problem is that, despite a timed $CO_2$ diffusion system and flow limitation, the cylinders have to be replaced too often. For example, for a set of 8 traps, a 10 kg cylinder of $CO_2$ will have to be replaced up to twice month, which is complicated from a logistic point of view and very costly. This places a real limit on the wider dissemination of this technology, even though it is highly effective and much in demand.

Consequently, there is currently no satisfactory solution to capture mosquitoes effectively which presents a reasonable cost for the private individual while at the same time being environmentally friendly.

In the context today of concern for the environment, and for purposes of effectiveness, it was therefore seen to be necessary to implement a new process for capturing mosquitoes.

The present invention provides an answer to the needs indicated above, namely effectiveness in capturing mosquitoes, inexpensive installation, no inconvenience in terms of changing the $CO_2$ cylinders or other consumables for the production of $CO_2$, and protection of the environment.

The present invention thus concerns a process for capturing mosquitoes by producing carbon dioxide ($CO_2$) directed towards one or more mosquito traps, the $CO_2$ being separated from the ambient air via at least one central system comprising at least one bed of microporous solid type materials, said process enabling an incoming flow of ambient air comprising 0.039% $CO_2$ in the central system to be used to produce, in the direction of one or more traps, a regular and controlled outgoing flow of $CO_2$ comprising at least 10 g of $CO_2$. per hour per trap.

In the present invention:

"capturing mosquitoes" means attracting mosquitoes and trapping them in a closed container.

"mosquito trap" means an appropriately shaped solid device allowing the mosquitoes to enter without their being able to escape once inside.

"central system" means the system separating the $CO_2$ from the ambient air and then releasing the extracted $CO_2$ and directing it towards the mosquito traps. This system must comprise at least one bed of microporous solid type materials and may comprise two or four or more beds of this type. The central system may be part of the same device as the mosquito trap or may be located tens of metres away from this trap or these traps. The central system may also include an odour bait in solid or liquid form diffusing molecules which attract mosquitoes in the outgoing gaseous flow.

"bed of microporous solid type materials" means any bed of materials which:

separates the $CO_2$ from the ambient air by adsorption, stores the $CO_2$ extracted, and then releases the $CO_2$ by desorption, to allow it to be directed towards the mosquito traps. These beds will also be called "molecular sieves" in the present invention. To limit the volume required, the microporous solid type materials must have a sufficiently high $CO_2$ absorption capacity to supply, with or without a drying step, a $CO_2$ flow with a flow rate of at least 10 g/hour/trap of $CO_2$.

In addition, the microporous solid must be able to withstand numerous "adsorption/desorption" cycles without deteriorating so that it can be used for at least one year or even several years.

The beds of microporous solid type materials may function alternately or simultaneously.

"alternate" functioning of the bed of microporous material means that the bed of material adsorbs the $CO_2$ for a set period of time and then desorbs the $CO_2$ for a set period of time.

"simultaneous" functioning of the microporous material beds means that one bed of material adsorbs the $CO_2$ while the other bed of material desorbs the $CO_2$ for a set period of time.

"$H_2O$ drying beds", also called "drying sieves", means beds of material enabling $H_2O$ to be eliminated by adsorption and then desorption. These materials include for example type 3A Zeolites, sold in particular under the name Z303 by Zeochem.

"regular and controlled flow" means a regular flow of $CO_2$ in each trap whose intensity is constant throughout the period of diffusion, for example 10, 20, 30 or 40 g/hour. In order to reduce daily electricity consumption, a programmer may also be added to limit the $CO_2$ diffusion periods to certain times of the day, for example to sunrise and sunset (the periods when mosquitoes are most active) and to hours of human presence in the protected area.

"continuous or alternate" means that the regular controlled outgoing flow of gas is continuous (without any stopping of the flow) or alternate (following a regular cycle of stoppage/activation for a few tens of seconds at a time).

"adsorption capacity" means the capacity for separation of the $CO_2$ from the ambient air on the material beds.

"ambient temperature" means the outdoor temperature during the day or the night in which mosquitoes are active. This temperature may vary from 15 to 40 degrees Celsius.

production with a "short cycle", "medium cycle" and "long cycle" means $CO_2$ production lasting on average 10 to 30 seconds, one hour and 10 hours respectively.

Figure 1:
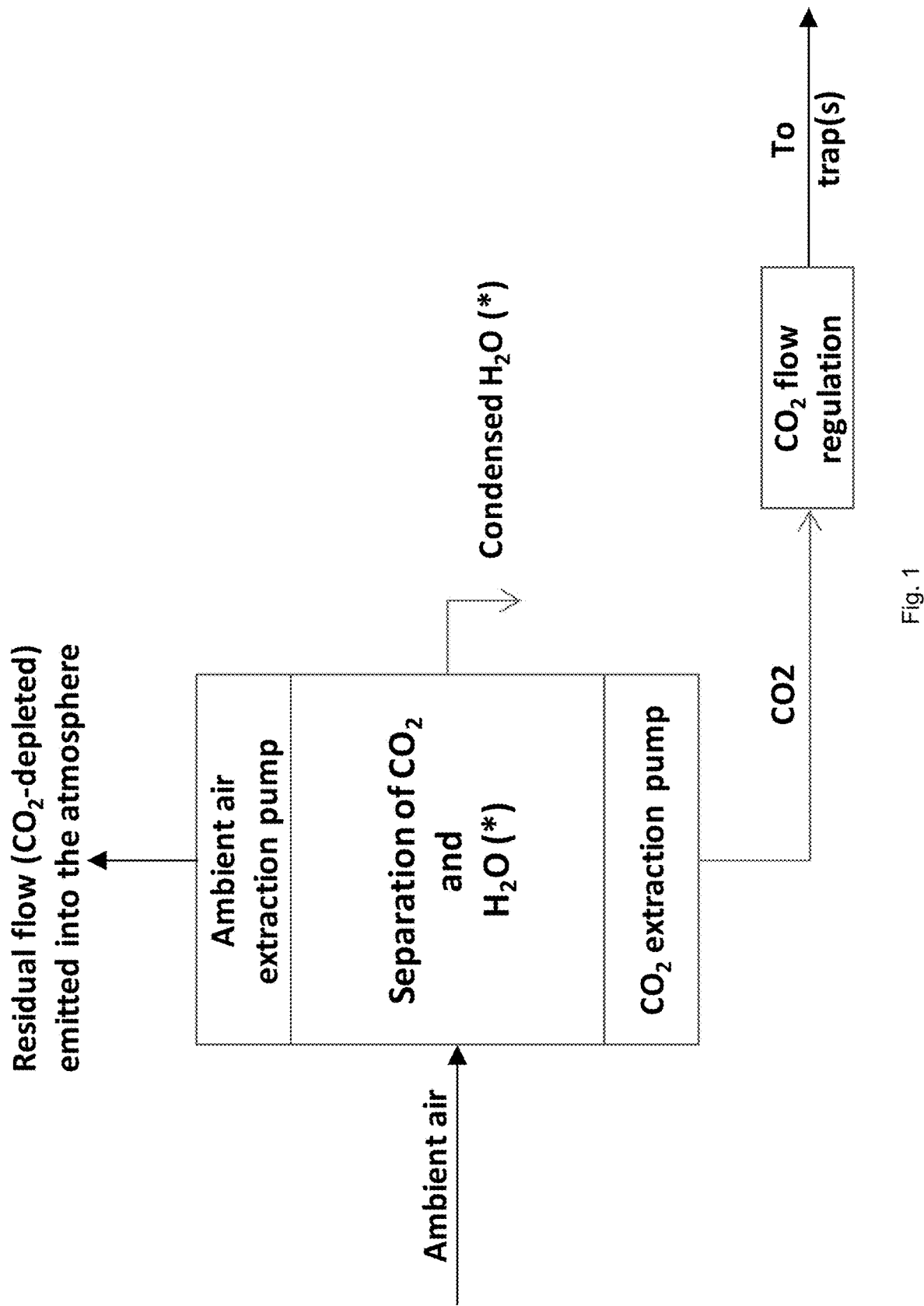
FIG. 1 shows a block diagram of the functioning of the process according to the invention. The asterix (*) in FIG. 1 indicates that depending on the chosen molecular sieve and the means of diffusion of the $CO_2$ towards the traps, it may be necessary to eliminate the humidity in the air.

The invention is described below in a more detailed way, also with preferred embodiments.

As indicated above, the process according to the invention can be used to produce a controlled regular outgoing gaseous flow of $CO_2$. This production or diffusion of $CO_2$ will of course be carried out during the hours in which the mosquitoes are present. When the mosquitoes are mosquitoes of the *Aedes Albopictus* type, known as the "tiger" mosquito, they sleep at night. In this case, the process implemented according to the invention will enable a gaseous outgoing flow to be produced during the day, with adsorption and storage of the $CO_2$ on the central system during the night and desorption of the $CO_2$ during the day. The production of $CO_2$ with a controlled regular flow rate will be carried out during the day.

Although the electricity consumption of the process according to the invention is relatively small (compared to the quantity of $CO_2$ separated from the ambient air), it is possible to reduce its "carbon footprint" by equipping it with a solar sensor to supply all or some of the energy necessary for the correct functioning of the process.

In a preferential embodiment according to the invention, the gaseous outgoing flow of the process according to the invention is continuous or alternate. To reduce the cost of the device implementing the process according to the invention, it is preferable to reduce the average flow of $CO_2$ by a considerable factor, without any reduction in effectiveness, by diffusing it alternately, over a cycle for example of approximately 20 s: 10 s of diffusion followed by stopping of diffusion for 10 s.

Thus the process for capturing mosquitoes according to the invention will comprise a central system, comprising a bed of microporous type materials and possibly a water drying bed ($H_2O$ sieve), which supplies one or more traps with $CO_2$. It is however not ruled out that the process may comprise several central systems, each comprising a bed of microporous type materials and possibly a water drying bed ($H_2O$ sieve), each supplying one or more traps. These various possibilities are to be used in accordance with the dimensions of the place which is to be protected and the density of the mosquitoes.

In a more preferential embodiment according to the invention, the gaseous outgoing flow comprises between 50 and 100% $CO_2$, while the remainder may be humid air. The flow of $CO_2$ does not need to be pure; it can be mixed with air or humidity. Since the $CO_2$ is released in the air at the trap, it mixes with it and disperses. The important parameter mentioned in the process according to the invention is the flow of $CO_2$ by mass, which must be at least about ten grams per hour on average.

Thus the outgoing gaseous flow may comprise a $CO_2$+air+$H_2O$ mixture with the following limits:

The total gaseous flow must remain of the same order of magnitude as the flow of pure $CO_2$, to avoid increasing the cost of the distribution of the flow towards the traps; at least 50% $CO_2$ must therefore be included in the total gaseous flow, The humidity must be sufficiently low to avoid causing condensation in the gaseous flow distribution network.

This embodiment enables the cost of implementation of the process according to the invention to be limited.

In another embodiment according to the invention, the gaseous outgoing flow is composed of pure $CO_2$. This embodiment will be more expensive but is feasible.

In another preferential embodiment according to the invention, the bed of microporous solid type materials presents a $CO_2$ adsorption capacity of at least 0.4 mol/kg at atmospheric pressure and at ambient temperature. Preferably the adsorption capacity is 0.7 to 0.8 mol/kg at atmospheric pressure and at ambient temperature. This capacity enables the storage and then, after desorption, the production of the gaseous outgoing flow of $CO_2$ of at least 10 g/hour/trap for approximately ten traps. Thus, for a process which can be used to supply 10 traps, the gaseous outgoing flow rate will be at least 200 g/hour, the gaseous outgoing flow being subsequently sent into each trap for a supply of 10 g/hour/trap.

In yet another very preferential embodiment according to the invention, the bed of microporous solid type materials consists of zeolites or amine-grafted cellulose fibres.

Figure 4:
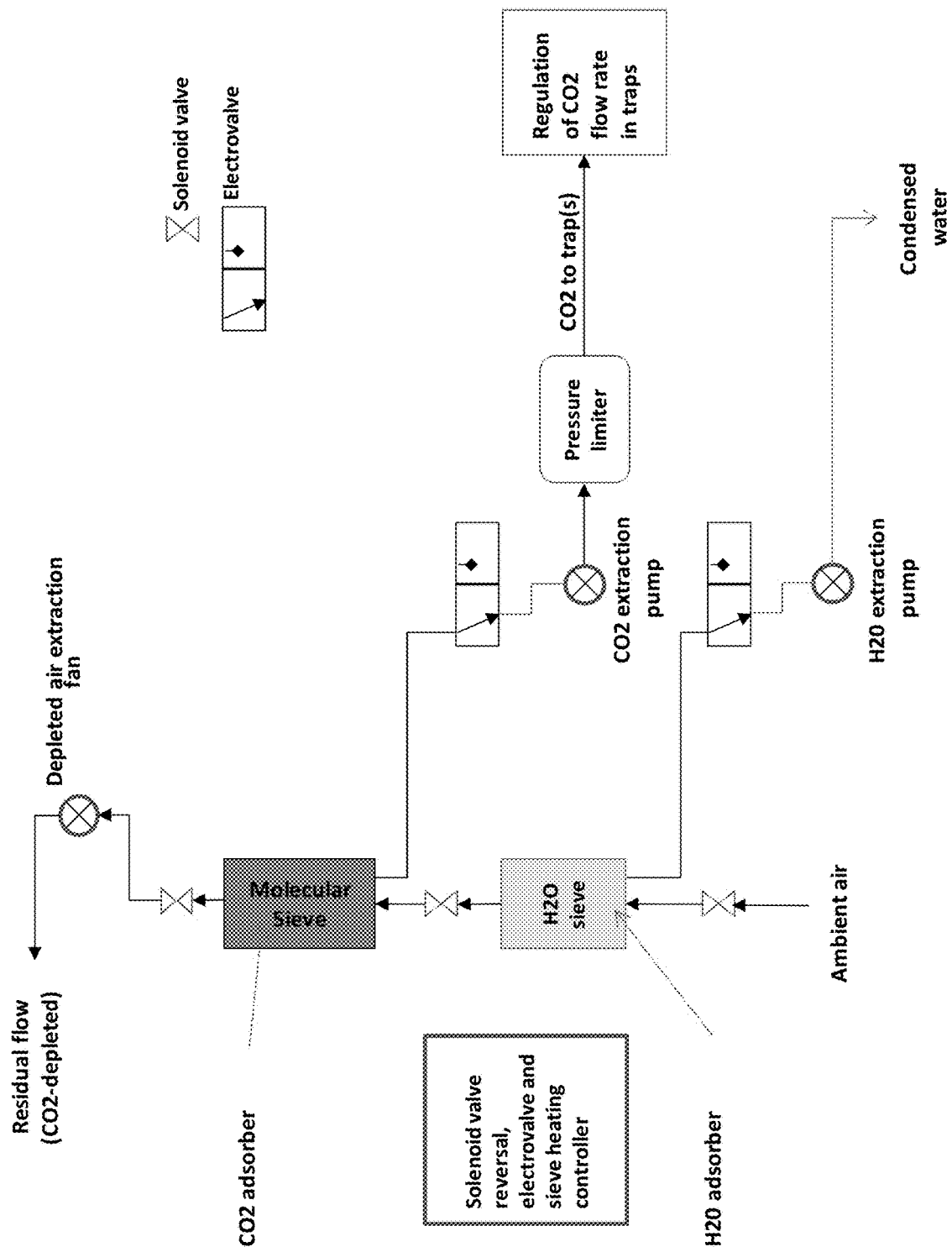
FIG. 4 shows a detailed block diagram of a $CO_2$ separation and diffusion system without drying of the incoming air, with a single molecular sieve and a single $H_2O$ sieve (drying). For mosquitoes which sleep at night, such as *Aedes Albopictus*, known as the "tiger mosquito", the $CO_2$ can be adsorbed and stored during the night and then directed towards the traps during the day.
Figure 5:
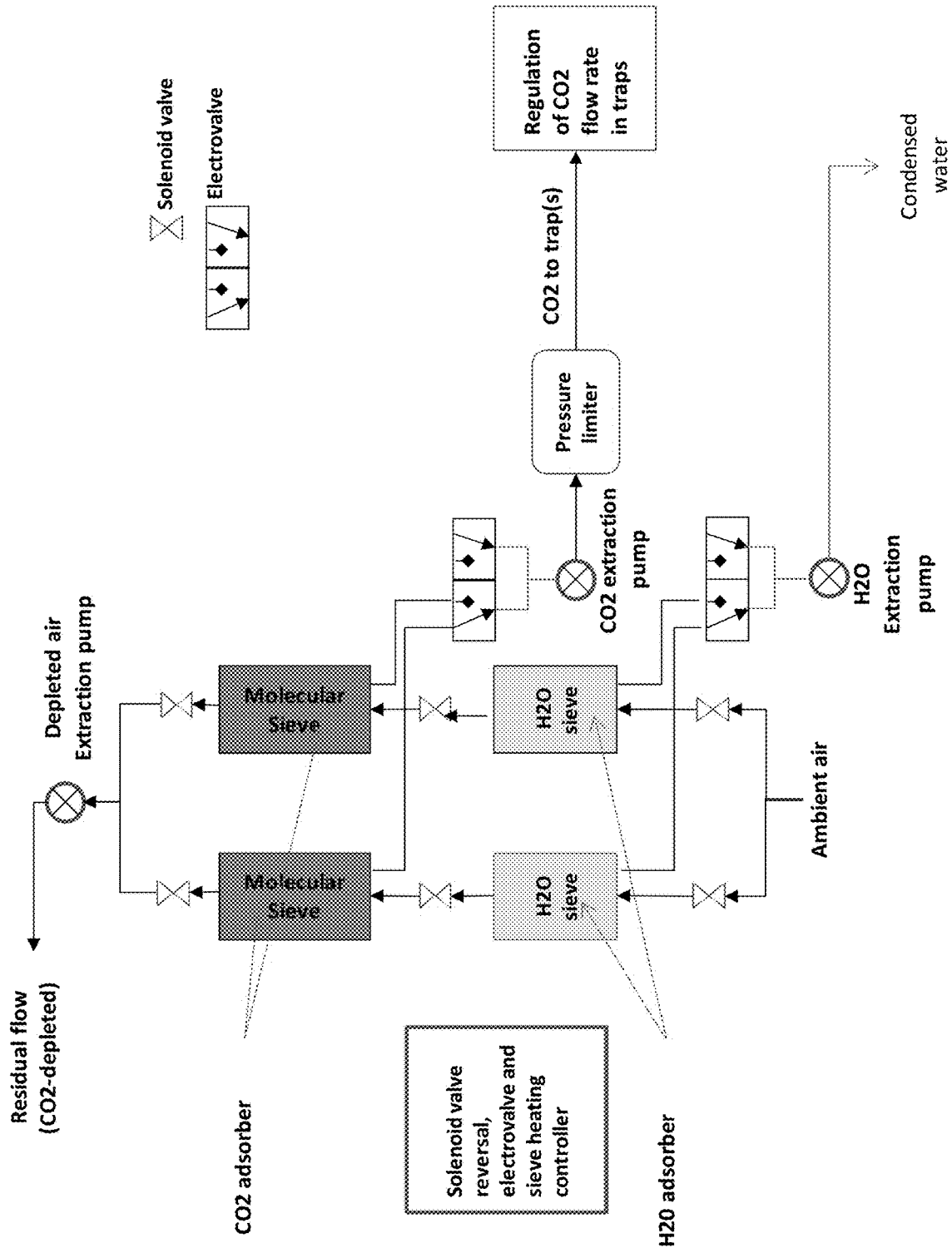
FIG. 5 shows a detailed block diagram of a $CO_2$ separation and diffusion system with drying of the incoming air comprising two molecular sieves and two $H_2O$ sieves (drying).
Figure 6:
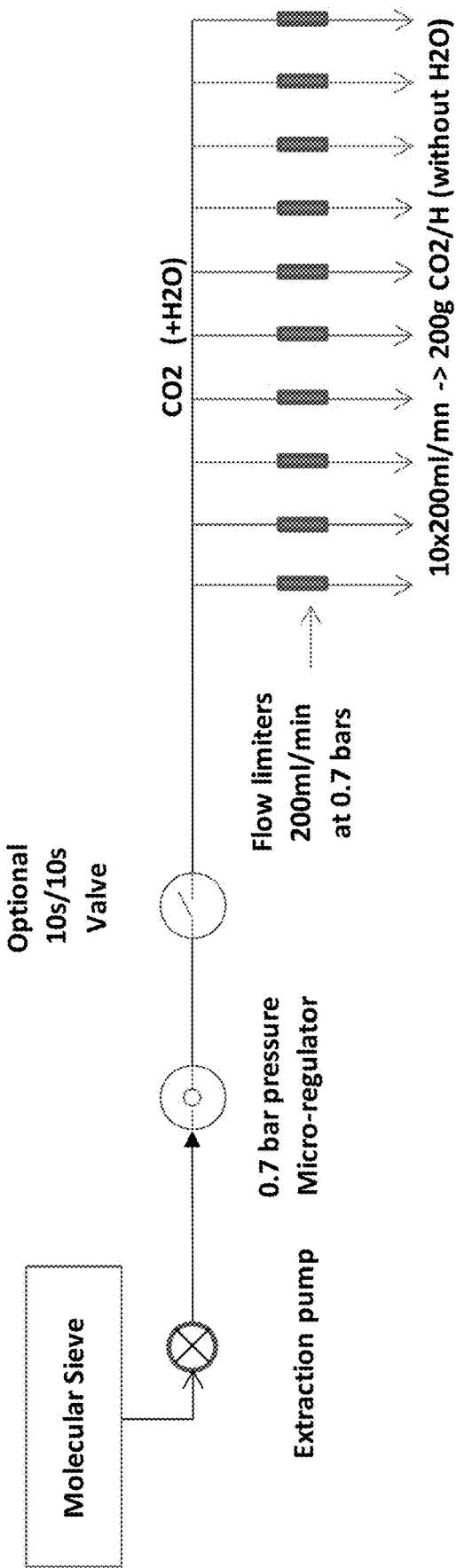
FIG. 6 shows a block diagram of the $CO_2$ desorption phase with control of the flow and of the distribution of the $CO_2$ towards multiple traps located some tens of metres away.

Examples of such preferred microporous solid type materials include:

commercial zeolites such as Li-LSX zeolites (LowSilicax zeolite) which have high adsorption capacities: 1.34 mol/kg or 5.9% by mass[1]. As these materials are extremely sensitive to humidity, a drying step is essential. In this case, at least one water drying sieve is added in the process for capturing mosquitoes according to the invention. These water desiccation sieves consist for example of type 3A, KA Zeolite. FIGS. 4 and 5 show a diagram of the process comprising water drying sieves.

cellulose grafted with amines[2,3]. This material has a high adsorption capacity of 1.4 mol/kg (6.2% by mass) at atmospheric pressure and at ambient temperature. This material has been used for joint capture of the $CO_2$ and of the humidity in a range of 20 to 80% relative humidity. The presence of humidity favours the adsorption of the $CO_2$.

In another preferential embodiment according to the invention, the microporous material bed(s) enable the adsorption, storage and desorption of the $CO_2$ from the ambient air alternately or simultaneously.

Figure 2:
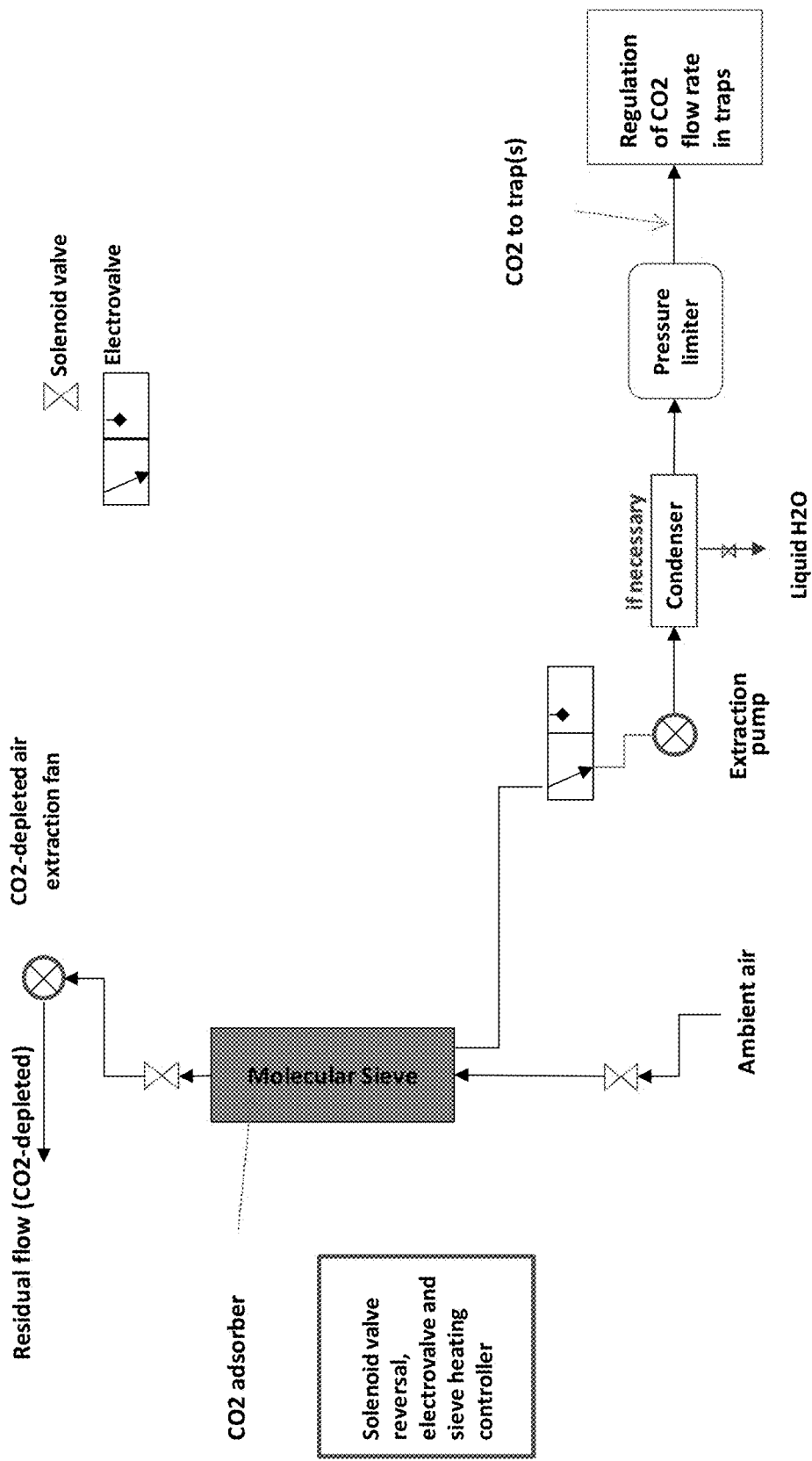
FIG. 2 shows a detailed block diagram of an alternate $CO_2$ separation and diffusion system without air drying, with a single molecular sieve. This system is equipped with a flow reversal (adsorption, desorption) and sieve heating (desorption) controller. It should be noted that the sieve reversal valves are not of the same size; for air intake a solenoid valve with a large section (for example 10 cm in diameter) is necessary and for production of the gaseous flow of $CO_2$ a mini-valve with a small section (a few millimetres in diameter) is sufficient. If necessary, a water condenser is added. For mosquitoes which sleep at night, such as *Aedes Albopictus*, known as the "tiger mosquito", the $CO_2$ can be adsorbed and stored during the night and then directed towards the traps during the day.

Thus the alternate mode has a central system comprising a bed of microporous material which, during the night, adsorbs and stores the $CO_2$ from the ambient air and, during the day, releases the $CO_2$ to enable production of a controlled regular flow of $CO_2$ towards the traps. This functioning is made possible by solenoid valves controlled by a programmer and enabling reversal of the flows in the molecular sieves as indicated in FIG. 2. Desorption is carried out by heating of the molecular sieve using, for example, a heating element which is placed in the sieve and whose electrical power supply is controlled by a programmer. An extraction pump enables the $CO_2$ to be extracted from the sieve and sent towards the traps. A regulator enables the pressure of the output flow to be adjusted to a set constant value, for example 0.7 bar. Regulation of the flow is then obtained by placing in each trap a flow limiting filter which provides a constant gaseous flow comprising at least 10 g/hour of $CO_2$, for example 20 g/hour of $CO_2$.

Figure 3:
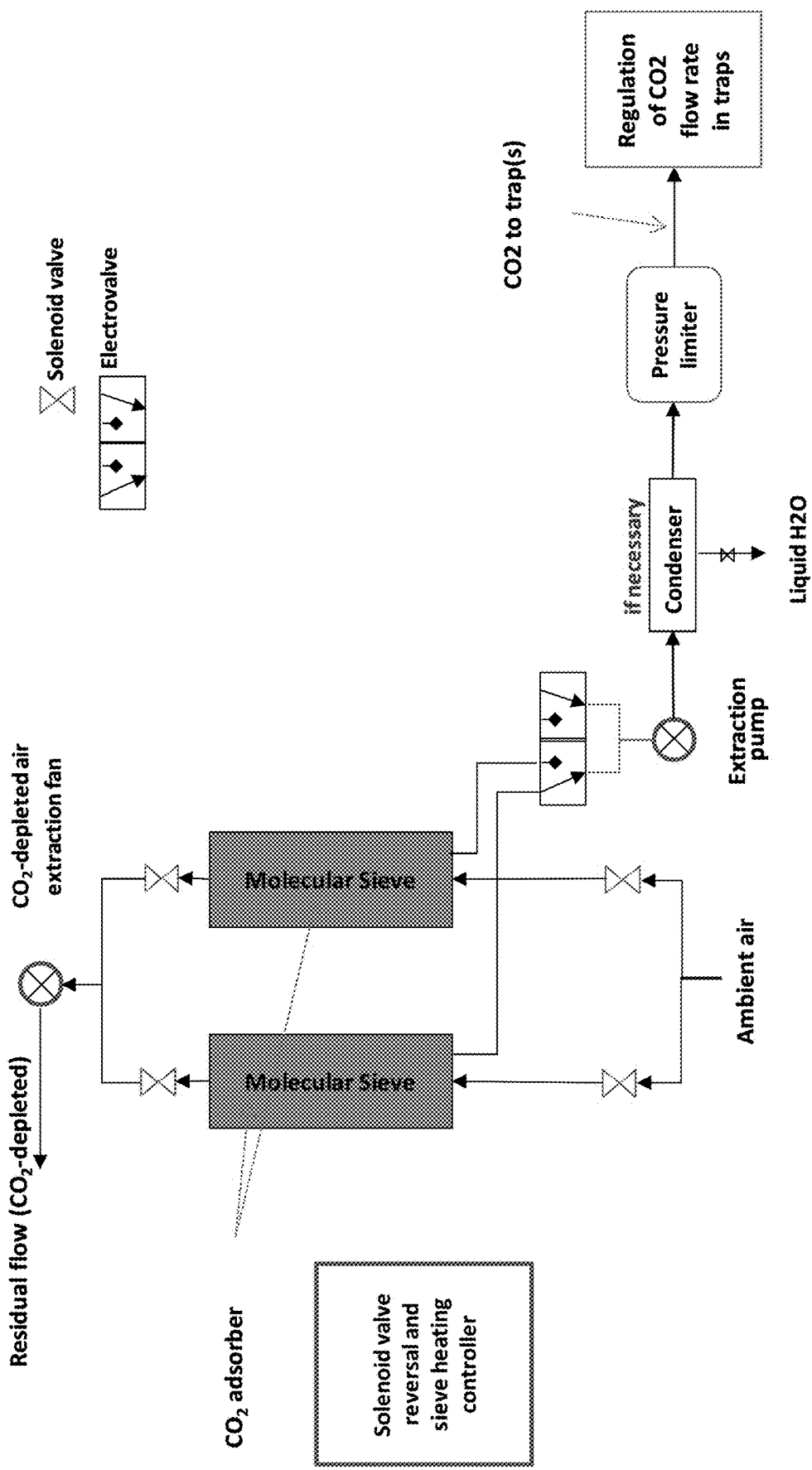
FIG. 3 shows a detailed block diagram of a $CO_2$ separation and diffusion system without drying of the incoming air with two molecular sieves operating alternately in tandem. This system is equipped with a flow reversal (adsorption, desorption) and sieve heating (desorption) controller. If necessary, a water condenser is added.

The simultaneous mode has a central system comprising at least two beds of microporous material. One of the beds enables the adsorption and storage of the $CO_2$, while the other enables the desorption of the $CO_2$, their role being reversed periodically and their activity simultaneous. Thus the process for capturing mosquitoes according to the invention can function continuously for any period. This functioning is made possible by solenoid valves controlled by a programmer and enabling reversal of the flows in the molecular sieves as indicated in FIG. 3. Desorption is carried out by heating of the molecular sieve using heating elements which are placed in the sieves and whose electrical power supply is controlled by a programmer. An extraction pump enables the $CO_2$ to be extracted from the sieve and sent towards the traps. A regulator enables the pressure of the output flow to be adjusted to a set constant value, for example 0.7 bar. Regulation of the flow is then obtained by placing in each trap a flow limiting filter which provides a constant gaseous flow containing, for example, 20 g/hour of $CO_2$.

The examples which follow serve to illustrate the invention and must in no way limit the scope of the subject matter disclosed in the claims.

From the examples which follow and in accordance with the chosen adsorbent material, it is possible to develop a process comprising other possible combinations of the parameters such as:

functioning with alternate or simultaneous separation/diffusion of the $CO_2$, with pre-drying of the air or not, with a $CO_2$ separation/diffusion cycle time of varying length, with alternate or continuous $CO_2$ diffusion.

The quantitative data supplied in these examples are given with respect to the chosen microporous solid type materials.

Example 1

Centralised System, with Alternate CO2 Separation and Diffusion with Drying of the Incoming Air and with a Long Cycle In this example, the centralised system supplies 10 traps, accumulates the $CO_2$ for 10 hours at night and diffuses it for 10 hours also, during the day.

FIG. 4 corresponds to the process described in this example.

Adsorbent Materials:

The chosen adsorbent is a 13X Zeolite (its Lithium form LiSX)[1], available commercially, with a $CO_2$ adsorption capacity of approximately 3% at 25° C. and at atmospheric pressure and with a $CO_2$ concentration of 0.039%. As this type of absorbent is sensitive to humidity, it is necessary to dry the air before it enters the zeolite sieve. The air is dried by causing it to pass through an alumina sieve with an $H_2O$ adsorption capacity of approximately 18 to 20%.

Functional Description:

The ambient air first passes through a drying sieve and then enters a $CO_2$ adsorbent sieve, and the dried and $CO_2$-depleted air is emitted into the atmosphere. These air flows are controlled by solenoid valves whose flow bore diameter is sufficient pour to avoid causing any pressure drop. A suction fan forces the air to pass through the sieves.

At the end of the adsorption cycle, the controller closes the air intake solenoid valves, stops the air extraction fan, and starts the $CO_2$ desorption and diffusion cycle. This is carried out by a combination of two actions: firstly by the heating of the sieve by an electrical heating element embedded in the material and secondly by the opening of the solenoid valve and the start-up of the $CO_2$ extraction pump; this creates a depression in the sieve and an overpressure towards the traps. This overpressure is maintained at a set value by a pressure limiter. The $CO_2$ is carried towards the traps by a tube. In each trap, a flow limiter consisting of a restriction enables the $CO_2$ to be distributed uniformly between the traps with a flow rate which depends on the value of the pressure.

The $CO_2$ is diffused continuously or alternately by activating and stopping the extraction pump cyclically (with a cycle of a few tens of seconds).

The drying sieve regeneration cycle is activated at the same time as the $CO_2$ desorption/diffusion cycle. The drying sieve is heated at the same time as the solenoid valve and the $H_2O$ extraction pump are opened. The pump creates a depression in the sieve and the steam is evacuated to the outside where it partially condenses.

Sizing:

The dimensions below, calculated for a continuous flow rate of 20 g/hour/trap, can be halved by adopting an alternate flow, supplying an average of 10 g/hour/trap.

It takes approximately 100 kg of 13X Zeolite to accumulate at least 2 kg of $CO_2$ which will be diffused during the day with a flow rate of 200 g/hour, which provides a flow rate of 20 g/hour in each trap.

To reach saturation of the zeolite in 10 hours, the air extraction fan must supply an air flow rate of approximately 350 m³/hour (i.e. a fan with a diameter of 20 to 25 cm). The geometry of the sieve is adapted so that the speed of movement of the air in the sieve is no more than about 0.3 m/s, which is obtained with a sieve contact section of at least 0.35 m².

For the $CO_2$ desorption/diffusion phase, the sieve is heated to a temperature of approximately 180° C. and the $CO_2$ extraction pump must enable the creation of a depression of 200 mbar in the sieve and a relative pressure of 700 mbar by delivering a flow of 2 litres/min of $CO_2$ towards the traps.

With air which has a relative humidity level of 80%, and a drying part of the system implemented with a single sieve which accumulates the water for 10 hours, approximately 300 kg of alumina is required.

While retaining the alternate functioning for the $CO_2$, it is possible to use functioning in tandem (as in example 2) for the drying, so as to reduce the quantity of alumina required.

The desiccant regeneration phase is carried out by heating the alumina to 200° C. and creating a depression of approximately 500 mbar with an extraction pump capable of delivering 15 litres/min. of steam.

Example 2

Centralised System, with Simultaneous $CO_2$ Separation and Diffusion, without Drying of the Incoming Air and with a Medium Cycle In this example, the centralised system supplies 10 traps, with a flow rate of 20 g/hour/trap, functioning with 2 sieves operating in tandem simultaneously, one accumulating $CO_2$ while the other releases it, in a cycle of approximately 1 hour.

FIG. 3 corresponds to the process described in this example.

Adsorbent Materials:

The chosen adsorbent is a cellulose fibre impregnated with amine[2,3], with a $CO_2$ adsorption capacity of approximately 3% at 25° C. at atmospheric pressure and with a $CO_2$ concentration of 0.039%. With this type of adsorbent, the presence of humidity in the air facilitates the adsorption of the $CO_2$; it is not therefore necessary to dry the air before it enters the molecular sieve.

Functional Description:

Cyclically, one of the sieves is in the $CO_2$ adsorption and storage phase while the other one is in the $CO_2$ desorption and diffusion phase. The duration of this cycle corresponds to the $CO_2$ saturation time during the adsorption phase.

The sieve in the adsorption phase is passed through by the ambient air which, once depleted in CO2, is emitted into the atmosphere. The two solenoid valves which control the intake and the emission of the air are then opened. These solenoid valves have a sufficient flow bore diameter to let through a sufficient air flow without causing a pressure drop. A suction fan forces the air to pass through the sieves.

The two corresponding solenoid valves of the sieve in the desorption phase are closed. This sieve is heated by an electrical heating element embedded in the material, and the $CO_2$ is extracted from it by the $CO_2$ extraction pump, through the corresponding solenoid valve which is then opened. The $CO_2$ is carried towards the traps by a tube. In each trap, a flow limiter consisting of a restriction enables the $CO_2$ to be distributed uniformly between the traps with a flow rate which depends on the value of the pressure.

The aminated cellulose also adsorbs water molecules which are desorbed at the same time as the $CO_2$ in the form of steam. To prevent the condensation of this water in the tubes transporting the $CO_2$ towards the traps from interfering with this transporting, a condenser is placed in the circuit of the process.

The $CO_2$ is diffused continuously or alternately by activating and stopping the extraction pump cyclically (with a cycle of a few tens of seconds).

At the end of the cycle, the programmer reserves the positions of the solenoid valves together with the heating of the sieve.

Sizing:

The dimensions below, calculated for a continuous flow rate of 20 g/hour/trap, can be halved by adopting an alternate flow, supplying an average of 10 g/hour/trap.

It takes approximately 10 kg of aminated cellulose to accumulate at least 200 g of $CO_2$ which will be diffused for 1 hour with a flow rate of 200 g/hour, which provides a flow rate of 20 g/hour in each trap.

To obtain saturation of the cellulose in 1 hour, the extraction fan must supply an air flow rate of approximately 350 m³/hour (i.e. a fan with a diameter of 20 to 25 cm). The geometry of the sieve is adapted so that the speed of movement of the air in the sieve is no more than about 0.3 m/s, which is obtained with a sieve contact section of at least 0.35 m².

For the CO2 desorption/diffusion phase, the sieve is heated to a temperature of approximately 95° C. and the $CO_2$ extraction pump enables the creation of a depression of 100 mbar in the sieve and a relative pressure of 700 mbar by delivering a flow of 2 l/min of $CO_2$ towards the traps.

Example 3

System with Simultaneous $CO_2$ Separation and Diffusion, Integrated in a Trap, without Drying of the Incoming Air and with a Medium Cycle In this example, the system supplies only one trap, with a flow rate of 20 g/hour, functioning with 2 sieves operating simultaneously in tandem, one accumulating $CO_2$ while the other releases it, in a cycle of approximately 1 hour.

FIG. 8 corresponds to the process described in this example.

Adsorbent Materials:

The chosen adsorbent is a cellulose fibre impregnated with amine[2,3], with a $CO_2$ adsorption capacity of approximately 3% at 25° C. at atmospheric pressure and with a $CO_2$ concentration of 0.039%. With this type of adsorbent, the presence of humidity in the air facilitates the adsorption of the $CO_2$; it is not therefore necessary to dry the air before it enters the molecular sieve.

Functional Description:

Cyclically, one of the sieves is in the $CO_2$ adsorption and storage phase while the other one is in the $CO_2$ desorption and diffusion phase. The duration of this cycle corresponds to the $CO_2$ saturation time during the adsorption phase.

Figure 7:
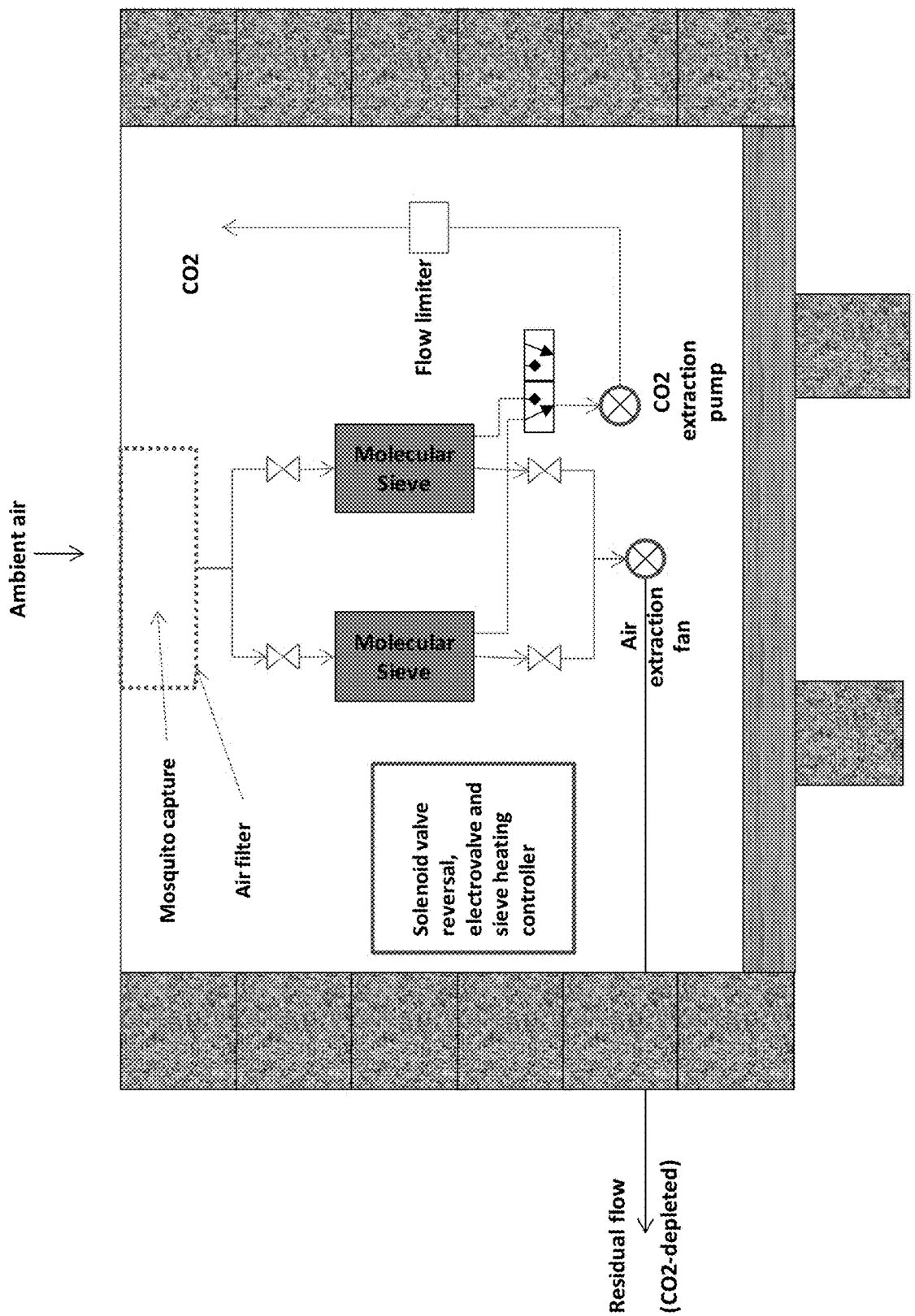
FIG. 7 shows a device of the central system implementing the process for capturing mosquitoes according to the invention comprising two molecular sieves operating alternately in tandem, supplying a single trap and positioned in the trap.

The sieve in the adsorption phase is passed through by the ambient air which, once depleted in $CO_2$, is emitted into the atmosphere. The two solenoid valves which control the intake and the emission of the air are then opened. These solenoid valves have a sufficient flow bore diameter to let through a sufficient air flow without causing a pressure drop. A suction fan forces the air to pass through the sieves. The same fan can also be used in the trap for capturing the mosquitoes, as indicated in FIG. 7.

The two corresponding solenoid valves of the sieve in the desorption phase are closed. The sieve is heated by an electrical heating element embedded in the material and the $CO_2$ is extracted from it by the $CO_2$ extraction pump, through the corresponding solenoid valve which is then opened. The $CO_2$ is carried towards the traps by a tube. In each trap, a flow limiter consisting of a restriction enables the $CO_2$ to be distributed uniformly between the traps with a flow rate which depends on the value of the pressure.

The steam emitted with the $CO_2$ does not hinder the functioning of the trap; on the contrary, the humidity attracts the mosquitoes.

The $CO_2$ is diffused continuously or alternately by activating and stopping the extraction pump cyclically (with a cycle of a few tens of seconds).

At the end of the cycle, the programmer reserves the positions of the solenoid valves together with the heating of the sieve.

Sizing:

The dimensions below, calculated for a continuous flow rate of 20 g/hour, can be halved by adopting an alternate flow, supplying an average of 10 g/hour/trap.

It takes approximately 1 kg of aminated cellulose to accumulate at least 20 g of $CO_2$ which will be diffused for 1 hour with a flow rate of 20 g/hour, which provides a flow rate of 20 g/hour in the trap.

To obtain saturation of the cellulose in 1 hour, the extraction fan supplies an air flow rate of approximately 35 m³/hour (i.e. a fan with a diameter of 10 cm). The geometry of the sieve is adapted so that the speed of movement of the air in the sieve is no more than about 0.3 m/s, which is obtained with a sieve contact section of at least 350 cm².

For the $CO_2$ desorption/diffusion phase, the sieve is heated to a temperature of approximately 95° C. and the $CO_2$ extraction pump enables the creation of a depression of 100 mbar in the sieve and a relative pressure of 700 mbar by delivering a flow of 200 ml/min of $CO_2$ in the trap.

Example 4

System with Alternate $CO_2$ Separation and Diffusion, Integrated in a Trap, without Drying of the Incoming Air and with a Short Cycle In this example, which partly results from a combination of the previous three examples, the system supplies only one trap, with a flow rate of 10 g/hour on average, functioning with a single sieve operating alternately in adsorption and then desorption mode, in a very short cycle of 30 seconds.

Adsorbent Materials:

The chosen adsorbent is a cellulose fibre impregnated with amine[1], with a $CO_2$ adsorption capacity of approximately 3% at 25° C. at atmospheric pressure and with a $CO_2$ concentration of 0.039%. With this type of adsorbent, the presence of humidity in the air facilitates the adsorption of the $CO_2$; it is not therefore necessary to dry the air before it enters the molecular sieve.

Functional Description:

Its functional diagram is similar to the first example, without the air drying.

To obtain such a short cycle, the process consists in using functioning in "pressure swing" mode only, without heating of the sieve during the desorption. The depression created by the $CO_2$ extraction pump must then be much less intense.

Sizing:

Because of the very short cycle it is also necessary to take into account a much lower adsorption efficiency. It takes approximately 500 g of aminated cellulose to accumulate at least 170 mg of $CO_2$ which will be diffused for 30 seconds with a flow rate of 20 g/hour.

To attain sufficient saturation of the cellulose in 30 seconds, the air extraction fan supplies an air flow rate of approximately 50 m³/hour (i.e. a fan with a diameter of 10 cm or 12 cm). The geometry of the sieve is adapted so that the speed of movement of the air in the sieve is no more than about 0.3 m/s, which is obtained with a sieve contact section of at least 500 cm².

For the $CO_2$ desorption/diffusion phase, the $CO_2$ extraction pump enables the creation of a depression of 900 mbar in the sieve with a flow rate of 400 ml/min and an output at atmospheric pressure.

REFERENCES

[1] N. R. Stuckert, R T Yang, $CO_2$ capture from the atmosphere and simultaneous concentration using zeolites and amine grafted SBA-15, *Environmental Science & Techno*, 45 (2011) 10257-10264.

[2] C. Gebald, J. A. Wurzbacher, P. Tingaut, T. Zimmermann, A. Steinfeld, Amine-based nanofibrillated cellulose as adsorbent for $CO_2$ capture, *Environmental Science & Techno*, 45 (2011) 9101-9108.

[3] J. A. Wurzbacher, C. Gebald, N. Piatkowski, A. Steinfeld, Concurrent separation of $CO_2$ and $H_2O$ from air by a temperature-vacuum swing adsorption/desorption cycle, *Environmental Science & Techno*, 46 (2012) 9191-9198.

The invention claimed is:

1. Process for capturing mosquitoes by producing carbon dioxide ($CO_2$) directed towards one or more mosquito traps, the process comprising:
    enabling an incoming flow of ambient air comprising 0.039% $CO_2$ in at least one central system, wherein the central system is part of the same device or devices as the mosquito trap or traps or located tens of meters away from the trap or traps,
    separating the $CO_2$ from the ambient air via the at least one central system, wherein the central system comprises at least one bed of heat swing and/or pressure swing regeneration microporous solid type materials impregnated or grafted with amines, and producing in the direction of one or more traps a gaseous outgoing flow with a relative pressure up to 0.7 bars and a controlled regular flow rate comprising at least 10 g/hour/trap of $CO_2$, wherein the at least one bed of heat swing and/or pressure swing regeneration microporous solid type materials enables alternate or simultaneous adsorption, storage, and desorption of the $CO_2$ from the ambient air, and wherein the intensity of the controlled regular flow rate of $CO_2$ is constant throughout a period of diffusion in one or more traps.

2. Process according to claim 1, wherein the gaseous outgoing flow with a controlled regular flow rate is continuous or alternate.

3. Process according to claim 1, wherein the gaseous outgoing flow is composed of pure $CO_2$.

4. Process according to claim 1, wherein the at least one bed of microporous solid type materials presents a $CO_2$ adsorption capacity of at least 0.4 mol/kg at atmospheric pressure and at ambient temperature.

5. Process according to claim 1, wherein the at least one bed of microporous solid type materials impregnated or grafted with amines consists of amine-grafted cellulose fibers.

6. Process according to claim 1, wherein the $CO_2$ is separated from the ambient air and directed continuously towards traps through two material beds operating in tandem, one of the two material beds enabling the adsorption and storage of the $CO_2$ and the an other of the two material beds enabling the desorption of the $CO_2$.

7. Process according to claim 1, wherein the gaseous outgoing flow comprises between 50 to 100% $CO_2$ by mass, a remainder being humid air, and the central system is located tens of meters away from the trap or traps.

* * * * *